United States Patent
Volbracht

(10) Patent No.: US 9,908,389 B2
(45) Date of Patent: Mar. 6, 2018

(54) AGRICULTURAL VEHICLE COMPRISING A CAB WINDOW HAVING CHANGEABLE TRANSPARENCY

(71) Applicant: CLAAS SELBSTFAHRENDE ERNTEMASCHINEN GMBH, Harsewinkel (DE)

(72) Inventor: Andreas Volbracht, Oelde (DE)

(73) Assignee: CLAAS Selbstfahrende Erntemaschinen gmbH, Harsewinkel (DE)

( * ) Notice: Subject to any disclaimer, the term of this patent is extended or adjusted under 35 U.S.C. 154(b) by 144 days.

(21) Appl. No.: 14/833,301

(22) Filed: Aug. 24, 2015

(65) Prior Publication Data
US 2016/0052374 A1 Feb. 25, 2016

(30) Foreign Application Priority Data
Aug. 25, 2014 (DE) .................. 10 2014 112 120

(51) Int. Cl.
*B60J 3/04* (2006.01)
*G02F 1/163* (2006.01)
*G02F 1/133* (2006.01)

(52) U.S. Cl.
CPC ............... *B60J 3/04* (2013.01); *G02F 1/163* (2013.01); *G02F 1/13306* (2013.01)

(58) Field of Classification Search
CPC ..................... B60J 3/04; G02F 1/163

USPC .............................................. 296/97.2, 96.19
See application file for complete search history.

(56) References Cited

U.S. PATENT DOCUMENTS

| 7,048,422 B1* | 5/2006 | Solomon | B60Q 1/268 345/76 |
| 2004/0239141 A1* | 12/2004 | Iwao | B60J 1/20 296/84.1 |
| 2005/0280275 A1* | 12/2005 | Uenuma | B60R 1/00 296/84.1 |
| 2006/0175859 A1* | 8/2006 | Isaac | B60J 3/04 296/97.4 |
| 2009/0058126 A1 | 3/2009 | Broude et al. | |
| 2012/0019891 A1 | 1/2012 | Dewell | |

FOREIGN PATENT DOCUMENTS

| DE | 41 28 717 | 3/1993 |
| DE | 103 52 226 | 6/2005 |
| DE | 20 2008 009 837 | 11/2008 |
| JP | 2003-276436 | 9/2003 |
| WO | WO 2012/156779 | 11/2012 |

* cited by examiner

*Primary Examiner* — Joseph D. Pape
(74) *Attorney, Agent, or Firm* — Collard & Roe, P.C.

(57) ABSTRACT

An agricultural vehicle has an operator's with at least one cab window. The at least one cab window is designed and configured such that a transparency of the cab window is changeable, preferably steplessly, at least in one subsection. As a result, an intensity of ambient light shining onto the operator's cab from the outside and through the at least one cab window is diminished such that a readability and operation of a control terminal in the cab is improved both in direct and indirect ambient light.

10 Claims, 4 Drawing Sheets

US 9,908,389 B2

AGRICULTURAL VEHICLE COMPRISING A CAB WINDOW HAVING CHANGEABLE TRANSPARENCY

CROSS-REFERENCE TO A RELATED APPLICATION

The invention described and claimed hereinbelow is also described in German Patent Application DE 10 2014 112 120.1, filed on Aug. 25, 2014. The German Patent Application, the subject matter of which is incorporated herein by reference, provides the basis for a claim of priority of invention under 35 U.S.C. 119(a)-(d).

BACKGROUND OF THE INVENTION

The invention relates to an agricultural vehicle comprising a cab window having a changeable transparency.

Agricultural vehicles, e.g., tractors or self-propelled harvesting machines such as forage harvesters or combine harvesters, typically have an operator's cab for the operator of the vehicle. The operator's cab comprises one or more cab windows, which provide the operator a view to the outside and can protect the operator from environmental influences, e.g., rain. The operator's cabs should be capable of providing the operator with a view from the operator's cab that is as unobstructed as possible in order to increase the overview and, therefore, safety during operation of the agricultural vehicle. In order to permit a view from the operator's cab that is as unobstructed as possible, operator's cabs nowadays often have a generous canopy having large-surface-area cab windows.

A number of displays and controls, at least some of which are combined in a terminal having a screen, are arranged in modern agricultural vehicles. Direct glare and/or scattered light that is too intense can make it difficult for the operator to read and operate the terminal, which can adversely affect safety during operation of the agricultural vehicle. In addition, a cabin canopy having large-surface-area cab windows can result in increased heat generation in the operator's cab, which can adversely affect the operator's performance. High-performance ventilation and/or an air conditioner for the operator's cab may be required in order to avoid this.

DE 41 28 717 A1 discloses an anti-glare device, which is arranged on a window, in particular a motor vehicle window. The anti-glare device comprises strip-shaped anti-glare sections along the upper edge of the window, which can reversibly switch from being light-permeable to light-impermeable. The anti-glare sections are switched by a sensor arranged behind the window and the anti-glare sections. The disadvantage thereof is that an operator is shielded only from direct glare and the sections that have been switched to being light-impermeable can obstruct the operator's view.

SUMMARY OF THE INVENTION

The present invention overcomes the shortcomings of known arts, such as those mentioned above.

To that end, the present provides an agricultural vehicle which has improved working conditions in terms of interfering external ambient light and which makes it possible to reduce the heat generation in the operator's cab of the agricultural vehicle.

In an embodiment, the invention provides an agricultural vehicle with an operator's cab having at least one cab window that is designed and configured such that a transparency of the cab window is changeable, in particular steplessly, at least one subsection thereof.

Due to the changeable transparency of at least one subsection of the cab window, preferably steplessly, the intensity of the ambient light shining from the outside onto the operator's cab and through the cab windows is diminished such that the readability and operation of a control terminal is improved both in direct and indirect ambient light, i.e., so-called scattered light. This thereby improves the display of information for the operator. The translucency of the cab window is retained during a change in the transparency, and so the operator still has a substantially unobstructed view out of the operator's cab. The working conditions for the operator is further improved by a change in the transparency of an area, in particular of the entire area, e.g., in the form of a darkening, of the cab window. In addition, in the case of large-surface-area cab windows in particular, the ambient light entering the operator's cab is reduced by means of a diminished transparency, thereby diminishing the heat generation in the operator's cab.

In an embodiment, the cab window is designed such that the transparency is changeable to different extents within an area having changeable transparency. This means that the degree of transparency of a cab window is designed to differ simultaneously within the area of the cab window. Given that the transparency is changeable to different extents within an area, it is advantageously possible to adjust a course of a darkening of the cab window, e.g., by a correspondingly changed transparency. In addition, subsections having different transparency are formed, thereby making it possible to improve a shielding of the operator from interfering ambient light.

Preferably, the transparency of the cab window is changeable depending on the brightness and/or a direction of incidence of the ambient light into the operator's cab and/or onto a cab window. This has the advantage that the transparency of the cab window can always be adapted to the prevailing light conditions, e.g., in order to adjust a darkening of the cab window. In addition, it is advantageous that the transparency only needs to be changed to the extent that is necessary.

Also, a sensor device for automatically changing the transparency of the at least one cab window is provided. An advantageous feature of the sensor device is that the transparency of the cab windows is adjusted depending on the current light conditions by detecting the intensity, e.g., the brightness of the ambient light, and/or the direction of incidence of the ambient light. In this case, the sensor device can detect the intensity and/or direction of incidence of the ambient light on the outside and/or inside of the operator's cab.

Furthermore, the transparency of a plurality of cab windows is changed individually or jointly, thereby making it possible to particularly precisely adapt the transparency of cab windows to the current light conditions.

An adjusting device for manually changing the transparency of one or more cab windows also is provided, thereby enabling the operator of the agricultural vehicle to adapt the change in transparency of a cab window to suit his particular needs, in order to adjust a darkening or tinting of the cab window, for example. It is therefore possible, for example, to select every window individually or in groups and to adjust the type and/or degree of the darkening of the transparency.

In an embodiment, a section having a changeable transparency is designed in the form of a graphical element. The section in which the transparency is changed is designed in the form of a graphical element, e.g., a letter and/or a pictogram. The area of the cab window surrounding the graphical element can have a transparency that differs from that of the graphical element. This has the advantage that, in addition to providing a possible shield against interfering ambient light, information is displayed to the operator directly in his field of vision, which information is situation-specific, in particular. An arrangement of the graphical elements on the cab window is freely selectable and changeable.

In an embodiment, the cab window has electrochromic properties at least in one subsection thereof. To this end, the cab window is coated with a material having electrochromic properties. In addition, a film having electrochromic properties is arranged on the cab window or within an intermediate layer of the cab window. The transparency of the cab window is changed in a stepped and/or stepless manner by applying an electric voltage, e.g., a direct voltage, to the electrochromic material. In this case, the translucency of the cab window can remain substantially unchanged when the transparency changes.

In an embodiment, at least a portion of the cab window is designed in the form of a transparent monitor. In this case, at least a portion of a transparent monitor is used and arranged as a cab window. The transparent monitor provided for a freely determinable arrangement and a substantially steplessly selectable extent of the change of transparency of the cab window. This has the advantage that information is displayed to the operator in a more precise and flexible manner.

In an embodiment, a working mode and a road travel mode are provided for the changing of the transparency. This has the advantage of ensuring compliance with statutory requirements on vehicle windows and the design thereof, in particular for road travel.

Preferably, the working mode and/or the road travel mode are automatically switched depending on a position of the agricultural vehicle. A switch between the road travel mode and the working mode is carried out automatically, thereby making it possible to reduce the operator's workload.

BRIEF DESCRIPTION OF THE DRAWINGS

Preferred variations of the method for producing a casing for a battery cell, as well as exemplary embodiments of inventive battery cells, are described in greater detail below with reference to the drawings, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
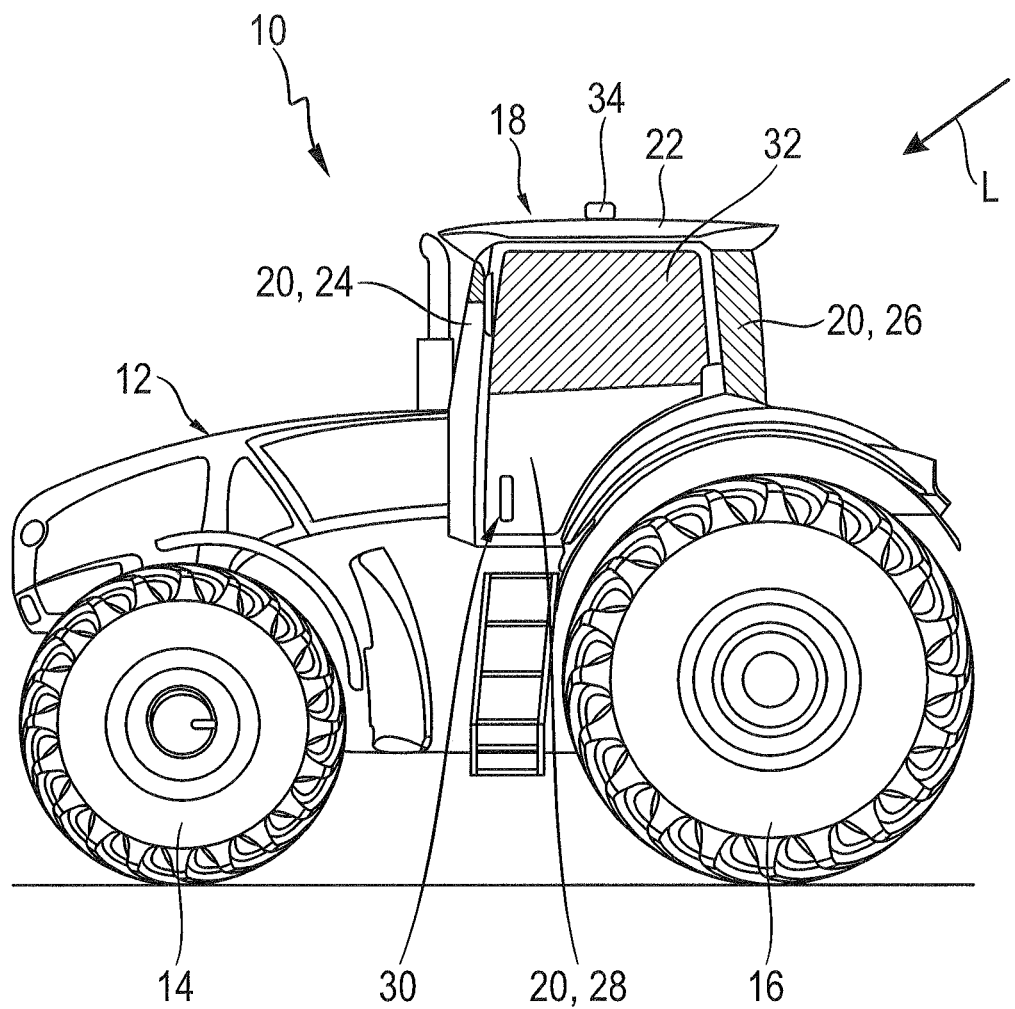
FIG. 1: shows a schematic illustration of an agricultural vehicle comprising cab windows according to the invention.

FIG. 1 shows a schematic illustration, from the side, of an agricultural vehicle 10 in the form of a tractor, wherein the basic design of a tractor is considered to be known to a person skilled in the art. An agricultural vehicle 10 is any vehicle that is used for agricultural work, e.g., a front loader or a harvesting machine such as a combine harvester or a forage harvester. The tractor has a drive unit 12, which is used to drive the front wheels 14 and/or rear wheels 16 of said tractor, as well as an operator's cab 18 for accommodating an operator. Display elements and controls (not illustrated) for operating the agricultural vehicle 10 also are usually arranged within the operator's cab 18.

In order to provide the operator with the best possible overview out of the operator's cab 18, the operator's cab 18 of the agricultural vehicle 10 comprises cab windows 20 designed with a large surface area. The cab windows 20 are arranged below a roof 22 of the operator's cab 18, substantially without interruptions all the way around. A cab window 20 is designed as a windshield 24, which can extend downward on both sides of the drive unit 12, or as a rear window 26 or a side window 28. It is also possible to arrange a cab window 20 in the roof 22 of the operator's cab 18. A cab window 20 in the form of a side window 28 also can be designed in the form of a swivelable operator's cab door 30, which provides the operator access into the operator's cab 18.

According to the invention, the at least one cab window 20 of the operator's cab 18 is designed and configured such that a transparency of the cab window 20 is changeable, in particular steplessly, at least in one subsection 26. Within the scope of the invention, the transparency of a cab window is understood to be the permeability of the cab window to electromagnetic waves, e.g., of the spectral range that is visible to humans, of the ultraviolet range, and/or of the infrared range. The change in the transparency can effect, e.g., a darkening of the cab window 20 that is perceptible to the operator, wherein the translucency of the cab window 20 substantially remains, e.g., without the cab window 20 becoming cloudy. The operator has an unobstructed view from the operator's cab 18 toward the outside through the cab window 20, which has a changed transparency and is not cloudy.

A stepless change in the transparency of the cab window 20 is particularly advantageous, since this makes it possible, e.g., to adapt the darkening of the cab window 20 to the effective light conditions, and only needs to be carried out to the extent that is necessary. In addition, a stepless change in the transparency of the cab window 18 can take place so as to be substantially unnoticed by the operator, whereby the operator's attention is not diverted from the operation of the agricultural vehicle 10. The transparency of the cab window 20 is changeable over the entire surface or at least in one subsection 32. In addition, the cab window 20 is designed such that the transparency for light from the infrared range of the electromagnetic spectrum is changed, in particular, steplessly.

Therefore, the infrared radiation entering the operator's cab is diminished while the transparency for visible light remains substantially unchanged, thereby making it possible to reduce heat generation in the operator's cab 18. This has the advantage that a ventilation system and/or air conditioner of the operator's cab 18 requires less power and is operated more efficiently. In addition, it is possible to design a cab window 20 such that the transparencies for different wavelengths are changed individually and/or jointly. In this case, for example, the transparencies of the cab window 20 for visible light and light from the infrared spectrum, so-called infrared light, is regulated and changed independently of one another.

The cab window 20 can have electrochromic properties, on the surface thereof or at least in one subsection, in order to change the transparency. This is achieved, for example, by an electrochromic layer, which is applied directly onto the cab window 20, or by means of a film having electrochromic properties. In this case, in order to change the transparency of the cab window 20, the property of the electrochromic material is used to change the transparency for electromagnetic waves depending on the electric direct voltage that is applied.

The transparency of a cab window 20 is changed, e.g., manually and/or automatically, depending on the brightness and/or a direction of incidence of an ambient light L into or onto the operator's cab 18. For example, the transparency of one or more cab windows 20 is changed uniformly and equally depending on the brightness of the ambient light L. As a result, scattered light entering the operator's cab, for example, is damped by the cab windows 20 to the extent that the operator perceives the light conditions within the operator's cab 18 to be pleasant and not disruptive. When the transparency changes depending on a direction of incidence of the ambient light L, the transparency of one or more cab windows 20, 24, 26, 28 is changed individually or jointly (FIG. 2), wherein the cab windows 20, 24, 26, 28 are changed equally or in an individualized manner.

The agricultural vehicle 10 preferably comprises a sensor device 34 for determining the brightness and/or the direction of incidence of the ambient light L within and/or outside the operator's cab 18. The sensor device 34 is arranged, e.g., on the roof 22 of the operator's cab 18 in order to detect the ambient light. As an alternative or in addition thereto, a sensor device 34 is arranged within the operator's cab 18. The direction of incidence of the ambient light L, which is determined by the sensor device 34, is used to dampen direct glare, which would strike the operator in the operator's cab 18, by an appropriate change in the transparency of one or more cab windows 20, 24, 26, 28.

Figure 2:
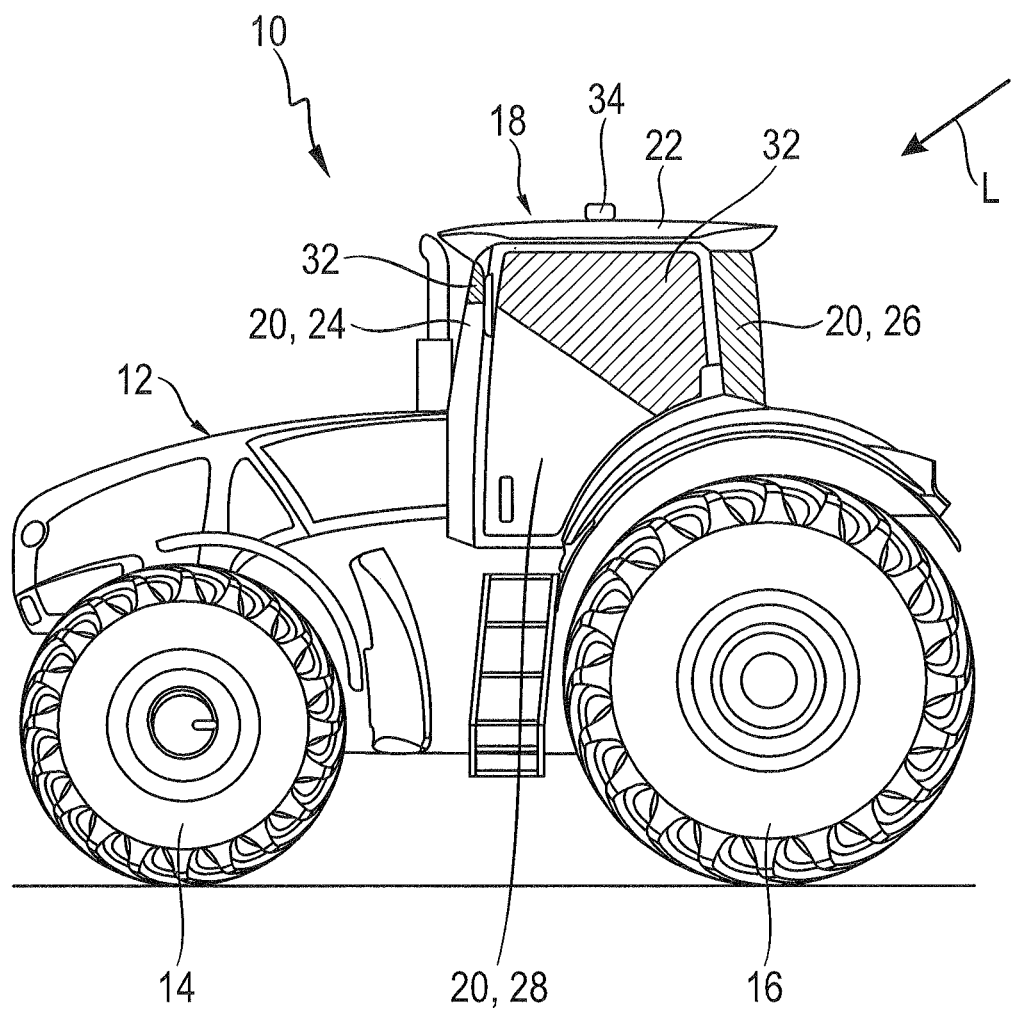
FIG. 2: shows a schematic view of an agricultural vehicle having transparency that is changed in subsections.

In the case of the agricultural vehicle 10 illustrated in FIG. 2, the ambient light L strikes the vehicle 10 and the operator's cab 18 from the rear and diagonally from above. The direction of incidence is determined by the sensor device 34 on the roof 22 of the operator's cab 18. On the basis thereof, a control device (not illustrated) connected to the sensor device 34 operates to change the transparency of one or more cab windows 20, 26, 28, at least in one subsection 32 thereof, for example, such that the operator in the operator's cab 18 is substantially protected against a glare from the directly incident ambient light L, thereby substantially avoiding an obstruction of the view out of the operator's cab 18. In this case, the transparency of the rear window 26 is changed over the entire area thereof such that a strong darkening of the rear window 26 is adjusted, e.g., for visible light and infrared light.

The side window 28 of the operator's cab door 30 can have, in a subsection 32 thereof, a change in the transparency corresponding to that of the rear window 26 and is darkened to a correspondingly strong extent. FIG. 2 shows only one side window 28, wherein the transparency of a second side window 28 on the other side of the vehicle is changed in a corresponding manner. A second subsection 36 of the side window 28, which is adjacent to the strongly darkened subsection 32, has a transparency that is unchanged or, e.g., is greater. As a result, the scattered light entering the operator's cab 18 is diminished in the event of an overall great brightness of the ambient light L, for example. In the event that the brightness and/or angle of incidence of the ambient light L changes, e.g., during travel of the vehicle 10 over a field, the transparency of each cab window 20 is suitably adjusted and changed.

Figure 3:
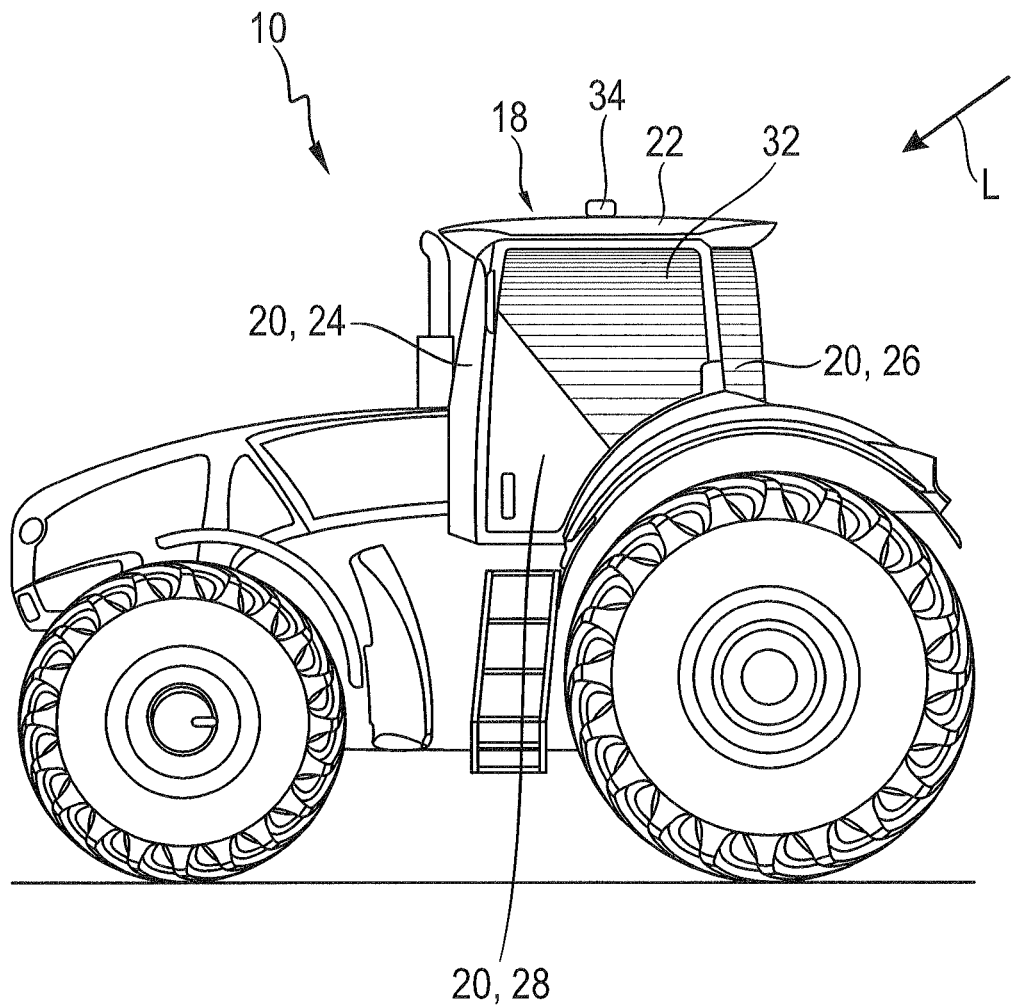
FIG. 3: shows a schematic view of an agricultural vehicle comprising cab windows, the transparency of which has been steplessly changed.

FIG. 3 shows cab windows 20, the degree of transparency of which has been changed by different extents within the cab window 20. For example, the degree of transparency of the rear window 26 and the side window 28 has a minimum in an upper region of the respective cab window 20, 26, 28 and can have a maximum in a lower region thereof. The degree of transparency is changed in sections or steplessly, thereby making it possible, e.g., to set a stepped or stepless course of a darkening of the cab window 20. In this connection, a maximum transparency means a substantially unobstructed incidence of electromagnetic waves, e.g., of visible light and/or infrared light, wherein a minimal transparency means the highest possible absorption thereof. In this connection, the maximum and minimal transparency of a cab window 20 depends on the technical design of the particular cab window 20. In the case of a minimal transparency, it is therefore possible for the cab window 20 to be non-transparent or substantially darkened while remaining transparent, for example.

Figure 4:
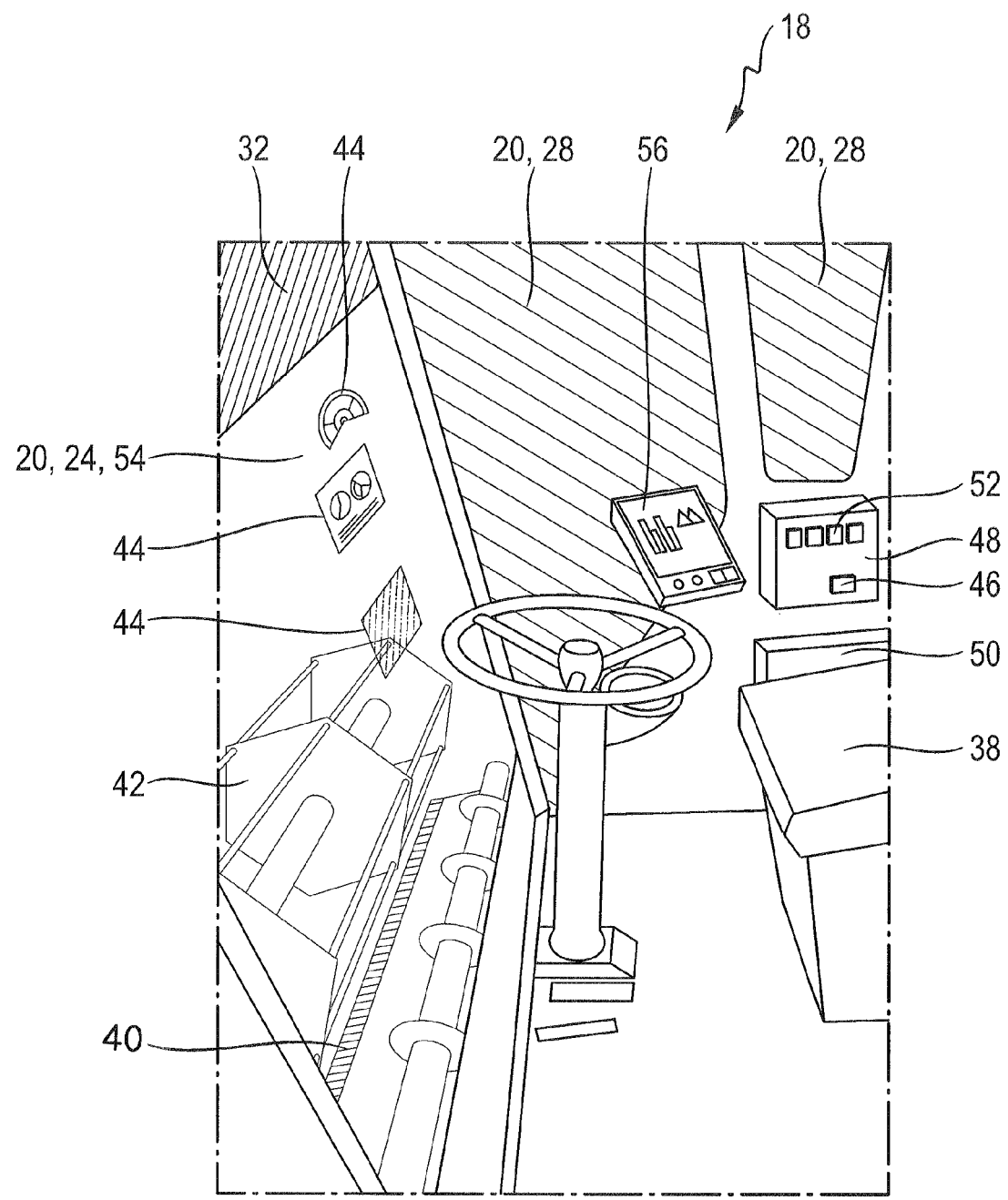
FIG. 4: shows a schematic, perspective interior view of an operator's cab comprising cab windows having a partially changed transparency in the form of graphical elements.

FIG. 4 shows a perspective interior view of an operator's cab 18 of an agricultural vehicle 10 in the form of a combine harvester. An operator can clearly see a mower 40 and a reel 42 of the combine harvester through the windshield 24 from an operator's seat 38. A control terminal 56 is arranged on the side in the operator's cab 18 for the purpose of displaying information and controlling the agricultural vehicle 10. The side windows 20, 28 are darkened over the entire area thereof with a uniform transparency and the windshield 20, 24 has, in an upper subsection 32 thereof, a darkened strip having reduced transparency, e.g., as glare protection against direct ambient light L. The transparency of the cab windows 20, 24 is additionally changed in a geometrically defined section, e.g., in the form of one or more graphical elements 44, such as letters or pictograms. The windshield 20, 24 comprises a plurality of these graphical elements 44, which have a transparency that is changeable with respect to the surrounding cab window 20, whereby the graphical elements 44 are visible to the operator and are used to display information. The graphical elements 44 can represent information in the form of text and/or images, wherein the graphical elements 44 are arranged on the cab window 20 in any configuration.

In order to permit graphical elements 44 to be depicted by a changeable transparency of a cab window 20, at least a portion of the cab window 20 is designed in the form of a transparent monitor 54. The cab window 20, 24 illustrated in FIG. 4 is designed, over the entire surface thereof, in the form of a transparent monitor 54. A transparent monitor 54 is based, for example, on organic light-emitting diodes, so-called OLEDs, which are luminous thin-film components made from organic semiconducting materials. This has the advantage that, in addition to the cab window 20, 54 having a transparency that is changed over an area, a number and shape of sections having changeable transparency, e.g., as graphical elements 44, is freely arranged and adjusted. The translucency of the transparent monitor 54 and, therefore, of the cab window 20 is substantially retained, and therefore the operator's view out of the operator's cab 18 is substantially unobstructed.

The agricultural vehicle 10 also has a road travel mode and a working mode for the manual and/or automatic operation of the cab windows 20, the transparency of which is adjustable. A switch between the road travel mode and the working mode is carried out by means of a selector switch 46. As a result, it is ensured that the statutory requirements are complied with, in particular during road travel, said statutory requirements specifying which sections are allowed to be changed to what extent in terms of transparency, in particular light permeability. For example, the windshield 20, 24 and the side windows 20, 28 are not allowed to be darkened during road travel, i.e., the transparency thereof must not be diminished. The agricultural vehicle illustrated in FIG. 4 is therefore operated in the working mode with darkened side windows 20, 28.

The switch between the road travel mode and the working mode is carried out automatically by an automatic control device 48, to which the current position of the vehicle 10 is transmitted, e.g., from a navigation unit 50, thereby making it possible to automatically switch to the road travel mode when exiting a field. The control device 48 can be connected to the sensor device 34, thereby making it possible to automatically regulate the change in the transparency of the cab windows by the control device 48. In addition, manual adjusting devices 52 for manually changing the transparency of a selected cab window 20 is provided.

LIST OF REFERENCE NUMBERS 12 agricultural vehicle
14 drive unit
14 front wheels
16 rear wheels
18 operator's cab
20 cab window
22 roof
24 windshield
26 rear window
28 side window
30 operator's cab door
32 subsection
34 sensor device
36 subsection
38 operator's seat
40 mower
42 reel
44 graphical element
46 selector switch
48 control device
50 navigation unit
52 manual adjusting device
54 transparent monitor
56 control terminal
L ambient light As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural vehicle comprising an operator's cab with at least one cab window,
   wherein the entire surface of the at least one cab window is formed by a transparent monitor;
   wherein the at least one cab window having the entire surface formed by the transparent monitor is designed and configured such that a transparency of the cab window is changeable in at least one subsection thereof; and
   wherein the at least one subsection of the at least one cab window having the changeable transparency is designed in the form of a graphical element, such that the graphical element is formed by changes in the transparency of the cab window.

2. The agricultural vehicle according to claim 1, wherein the at least one cab window is changeable steplessly in the at least one subsection.

3. The agricultural vehicle according to claim 1, wherein the at least one cab window is designed such that the transparency is changeable to different extents within an area having changeable transparency.

4. The agricultural vehicle according to claim 1, wherein the transparency of the least one cab window is changed depending on at least one of the following: a brightness, a direction of incidence of an ambient light (L) into the operator's cab and direction of incidence of an ambient light (L) onto the cab window (20).

5. The agricultural vehicle according to claim 1, further comprising a sensor device, wherein the sensor device provides for automatically changing the transparency of the at least one cab window.

6. The agricultural vehicle according to claim 1, wherein the transparency of a plurality of cab windows is changed individually or jointly.

7. The agricultural vehicle according to claim 1, further comprising an adjusting device for manually changing the transparency of the at least one cab window.

8. An agricultural vehicle comprising an operator's cab with at least one cab window,
   wherein the entire cab window is formed by a transparent monitor;
   wherein the portion of the at least one cab window formed by the transparent monitor is designed and configured such that a transparency of the cab window is changeable in at least one subsection thereof; and
   wherein the at least one cab window has electrochromic properties, at least in said one subsection.

9. The agricultural vehicle according to claim 1, wherein a working mode and a road travel mode are provided for changing the transparency.

10. The agricultural vehicle according to claim 9, wherein the working mode, the road travel mode or both are automatically switched depending on a position of the agricultural vehicle by an automatic control device that is connected to a navigation device.

* * * * *